(12) United States Patent
Tal-or

(10) Patent No.: US 7,411,311 B2
(45) Date of Patent: Aug. 12, 2008

(54) WAVE POWER PLANT

(75) Inventor: Yaniv Tal-or, Haifa (IL)

(73) Assignees: Y.T. Enterprises Ltd, London (GB); Winston Group Ltd, London (GB)

( * ) Notice: Subject to any disclaimer, the term of this patent is extended or adjusted under 35 U.S.C. 154(b) by 155 days.

(21) Appl. No.: 10/597,301

(22) PCT Filed: Feb. 24, 2004

(86) PCT No.: PCT/IL2004/000179

§ 371 (c)(1),
(2), (4) Date: Jul. 19, 2006

(87) PCT Pub. No.: WO2005/080791

PCT Pub. Date: Sep. 1, 2005

(65) Prior Publication Data

US 2008/0018113 A1  Jan. 24, 2008

(51) Int. Cl.
*F03B 13/12* (2006.01)
(52) U.S. Cl. .............................. 290/53; 290/42; 416/83
(58) Field of Classification Search .................. 290/42, 290/43, 44, 53, 54, 55; 416/82, 83
See application file for complete search history.

(56) References Cited

U.S. PATENT DOCUMENTS

| 1,960,622 A | | 5/1934 | Du Pont | |
|---|---|---|---|---|
| 4,258,270 A | * | 3/1981 | Tornkvist | 290/53 |
| 4,335,319 A | * | 6/1982 | Mettersheimer, Jr. | 290/54 |
| 4,355,511 A | * | 10/1982 | Jones | 60/507 |
| 4,486,145 A | * | 12/1984 | Eldredge et al. | 416/82 |
| 4,490,621 A | | 12/1984 | Watabe | |
| 4,525,122 A | * | 6/1985 | Krnac | 416/80 |
| 4,843,249 A | | 6/1989 | Bussiere | |
| 5,009,571 A | * | 4/1991 | Smith | 416/79 |
| 5,084,630 A | | 1/1992 | Azimi | |
| 5,244,359 A | | 9/1993 | Slonim | |
| 5,311,064 A | * | 5/1994 | Kumbatovic | 290/53 |
| 5,324,169 A | * | 6/1994 | Brown et al. | 416/83 |
| 7,042,112 B2 | * | 5/2006 | Wood | 290/53 |

FOREIGN PATENT DOCUMENTS

| DE | 004320808 A1 * | 6/1993 |
|---|---|---|
| FR | 501795 | 4/1920 |
| GB | 384603 A | 12/1932 |
| JP | 57081168 | 5/1982 |
| WO | PCTIL1999000258 | 9/2000 |
| WO | PCTIL2001000271 | 10/2002 |

* cited by examiner

Primary Examiner—Nicholas Ponomarenko
(74) Attorney, Agent, or Firm—Lilling & Lilling PLLC

(57) ABSTRACT

Wave power plant consisting of frame carrying at least two paddles unit, capable of moving successively in series, when driven by progressive waves and returning by the gravitation power and the backward wave's force. The plant has an appropriate means with at least one crankshaft mechanism for transferring the successive motion of paddle units in two ways into electric energy. Each of the paddles units have a rod, to be submerged into the sea and which is secured on the frame with possibility for pivoting with respect thereof, the lower extremity of the rod is terminated by a paddle plate and the paddles units are arranged around the frame in series. The energy consumed successfully by each paddle unit is equal to the energy of the paddle's movement forward from the forward wave's force plus the energy of the paddle's movement backward from the backward wave's force and the paddle's gravity. The plant's energy is consumed, in at least one hydraulic engine, which rotate generators.

8 Claims, 6 Drawing Sheets

WAVE POWER PLANT

FIELD OF THE INVENTION

This invention relates to a plant, which uses the energy of sea waves plus the energy of gravitation and converts these energies into electric energy. The plant according to this invention can produce high power production.

BACKGROUND OF THE INVENTION

There are different solutions for the production of energy from sea waves, for example, solutions based on wave height, wave movement, etc. The present invention utilizes both the wave length and the wave width by the forward wave motion, the backward wave motion and the force of gravity in the most efficient way, something that other proposed solutions do not.

The following are examples of the innovation inherent in the present invention as compared with the patents enumerated below, both from the point of view of the operating principle and structure, and from the point of view of energy considerations—allowing greater energy to be attained and produced.

1. (i) U.S. Pat. No. 5,084,630 utilizes only the width of the wave and not the length thereof.

In this patent there is disclosed a system consisting of number of units provided with paddles for each section of wave width. At the bottom of each paddle there are plates. The plates are spaced laterally one from another relative to the direction of wave movement (FIG. 1, the patent top view, shows it). Each paddle activates a pump. In this way, the wave power is not sufficiently utilized because after the wave strikes the paddle and leaves it, it continues to advance and is not longer in contact with the paddle, In FIG. 1, part of the 30 hits the plate 44, leaves the paddle and the wave's part continues to move without utilized its power any more. Other parts of the wave 30 hit the plates 46, 48, 50, 52, 54 and 56, each one wave's part hits only one plate and continue to move without utilizing its power any more. Hence, the wave's power is not fully utilized. The system is disclosed in U.S. Pat. No. 5,084,630 utilizes variations in sea level. For this purpose it is provided with a dedicated subsystem, including a set of separates pumps. Due to this provision the whole system is complicated, as it requires additional control means for coordination of the paddle disposition with the variation in sea level. Furthermore, as the disposition of the paddle is continuously changed and the paddle is not submerged deeply enough to maximally utilize available energy, it is not possible to utilize the energy of those wave's components that move under the wave.

The present invention utilizes:

most efficiently both the length and the width of the wave in the following way:

The lower extremities of the paddles are parallel to the wave width. They are arranged one after other in such a way that from a top view, they are arranged in series. Then, when the wave's part strikes the lower extremity of the first paddle it continues to move, and also strikes the other paddles, until the wave's part is flattened. In this way, the power of the wave is consumed more efficiently so as to get maximum energy from the wave. The energy of the next wave coming after the first wave will be utilized in a similar way.

(ii) U.S. Pat. No. 5,084,630 utilizes:

Only the energy in one direction of each paddle. When a paddle, 66+68+70+82+84 as it is shown in FIGS. 3-7, moves pivotal forward, the piston 124+128 as it is shown in FIG. 8, pushes oil within hydraulic cylinder 130 to give the energy to the generator 196, through 188, 146 and accumulartor 140. The oil comes from hydraulic tank 208 through pipe 210. When the paddle returns backward after the wave leaves the paddle, the piston 124+128 returns back and presses some air and/or oil, if desired back to the tank 208 through inlet pipe 212. The accumulator 140 does not get oil and the generator 196 does not get energy. The U.S. Pat. No. 5,084,630 has a one direction piston. The patent uses the paddle energy in one direction, the patent does not utilize the paddle's energy.

The present invention utilizes:

The whole paddle energy. The invention has for each paddle, a bi-directional piston. When a paddle move forward with the wave, the piston inside the hydraulic cylinder, pushes oil to the first accumulator, after the wave leave the paddle, it returns backward and the same piston pushes oil to the second accumulator. The two accumulators send the oil throgh pipes to an hydraulic engine that rotates a generator. The present invention receive energy from both paddle pivotal forward motion and paddle pivotal backward motion.

2. (i) PCT/IL99/00258 or AU PP8932 or GB9800394.0 patent requests (they are the same requests), (hereinafter: "PCT/IL99/00258 patent requests") show in the application—page 5 paragraphs 4,6, and 7, that the invention has one rod with two pistons with two hydraulic cylinders, both of them send the oil to one accumulator. It is theoretical, in reality the only way that an accumulator can be filled by hydraulic cylinders is, one by one. The hydraulic cylinders above the paddle rod operate one by one and the hydraulic cylinders below the paddle rod operate one by one also, but all the hydraulic cylinders, above and below paddle rod, don't operate one by one. In this way the accumulator can't be filled and work properly. The PCT/IL99/00258 patent requests can be used only to produce energy up to the accumulator. The accumulator should send oil to hydraulic engine that operates the generator. The PCT/IL99/00258 patent requests can't make progress from the accumulator to the generator, because the accumulator does not work. The PCT/IL99/00258 patent requests not can work and produce energy because it uses one accumulator.

In the present invention, there are two accumulators (it is shown below in FIG. 4). All pistons oil exit in the first direction, fill the first accumulator with oil one by one, when the paddles move forward, and all pistons oil exit in the second direction, fill the second accumulator with oil one by one when the paddles move backward. This invention can be used to produce electric energy with two accumulators that send the oil to hydraulic engine that rotates the generator.

(ii) PCT/IL99/00258 patent request claims don't say that in backward paddle unit motion the energy is utilized, i.e. after a wave leave the paddle's plate and the paddle falls pivoting with its gravitation and the backward wave's power, this paddle energy is not utilized. The only energy that is utilized is the energy of a wave that hits the paddle's plates. The gravitation energy of each paddle and the backward wave's energy aren't utilized.

The present invention shows in claim 1, that either, in forward paddle unit motion, the paddle's energy is accepted and consumed and, in backward paddle unit motion, the paddle's energy is accepted and consumed.

The present invention utilizes:

The whole paddle energy. The invention has a bi-directional piston for each paddle. When a paddle move forward with the wave, the piston inside the hydraulic cylinder, pushes oil to the first accumulator, after the wave leaves the paddle, it returns backward and the same piston pushes oil to the second accumulator. The two accumulators send the oil through pipes to an hydraulic engine that rotates a generator. The present invention receives energy from both motions: paddle pivotal forward motion and paddle pivotal backward motion.

The present invention produces energy in the most efficient way, and the invention's technology is better than PCT/IL99/00258.

3 (i) PCT/IL01/00271 patent request shows in their application different method and different drawings than the present invention, as explained in the PCT/IL01/00271 International Preliminary Examination Report patent request, Item I, in which the FIG. 1-FIG. 6 are the present invention.

The following is Item I in the above PCT/IL01/00271 report:

"The present examination authority considers that the amendments files with the letter dated Jun. 17, 2002 (received on Oct. 21, 2002) introduce subject-matter which extends beyond the content of the application as originally filed, contrary to Article 34(2)(b) PCT. The amendments concerned are the following:

With the above-mentioned letter the application has amended the drawing FIGS. 1 and 2 on drawings page 1/6, and has introduced the drawings FIG. 5 on drawings page 4/6 and drawing FIG. 6 on drawing page 5/6. The amended "connections" in FIGS. 1 and 2, as well the two additional drawings FIGS. 5 and 6 where not contained in the drawings pages 1/5-5/5 as originally filed.

It is not apparent how the amended "connections" in FIGS. 1 and 2, or the additional FIGS. 5 and 6 are directly and unambiguously derivable from the content of the application as originally filed. Although the respective structural arrangement shown in said FIGS. 1, 2, 5, and 6 may indeed not be excluded from the original subject-matter, it remains that it is not explicitly indicated in the application as originally filed that said respective structural arrangement of FIGS. 5 and 6 necessarily has to be realized in order to perform the claimed invention, or how/why the original "side-to-side connection" of FIGS. 1 and 2 may be superseded by a "bottom-to-bottom connection".

Hence, the amendments in FIGS. 1 and 2, as well as the additional FIGS. 5 and 6 implicitly introduce subject-matter which extends beyond the content of the application as originally filed, contrary to the requirements of Article 34(2)(b) PCT.

As foreseen by rule 70.2(c) PCT, this international preliminary examination report is being established as if the above mentioned amendments and additional had not been made. Hence, it is theoretically assumed for the rest of this report that the drawings figures on files are those shown on drawing page 1/5-5/5 as originally filed. Similarly, the description parts related to the amendments and additions in the drawings are considers not to have made.

Form PCT/Separate Sheet/409 (Sheet 1) (EPO-April 1997)"

While the connection of the rod 3 is to the side of 14 as in PCT/IL01/00271 patent request and a wave arrives and hits there is an energy loss that comes from the momentum of the 14 side distance multiply by the paddle's weight. When the plant is large each of the paddles have a big weight, which bring to a high momentum with high energy loss.

Following the PCT/IL01/00271 International Preliminary Examination Report, I was forces to ask the PCT patent request for the present invention with the new FIGS. 1 and 2 that I sent to the PCT/IL01/00271. The figures were not published because the PCT/IL01/00271 International Preliminary Examination Report was not published. In addition: please note to the $3^{rd}$ paragraph above this paragraph, from the words: "As foreseen by rule 70.2(c) PCT" till the words: "the drawings are considers not to have made."

This invention bottom-to-bottom connection brings an essential change with high advantage, that the plant energy production is higher than PCT/IL01/00271 patent request.

(ii) The PCT/IL01/00271 patent request uses, in each one of the paddle unit, as it is written in its claim 1, only one crankshaft mechanism and it can be applied only to very small waves. It can be applied for high waves. When a high wave, (e.g. 5 meters wave height, etc. ) arrives, it hits the paddle plates with high force and one crankshaft mechanism, which is the piston 1 in the present invention drawings, should be very large and the piston size is not realistic piston to be operated.

The piston's area is calculated according to the following formula:

The piston area=(The wave's force)/(The pressure in the hydraulic system). Since the piston size is so large and not realistic, the plant must have at least two piston to that each one of the two (for example two) pistons' area is half size of the original one piston and only by splitting the one piston to at least two pistons, the plant can work. The present invention using at least two crankshaft mechanisms, as it is written in the present invention claim 1, which can be applied for high waves that bring high power for high plant electric energy production.

Each one of the above two alterations in respect of PCT/IL01/00271 patent request is an essential alteration. According the above $1^{st}$ alteration the, the present invention plant energy production is much more than in PCT/IL01/00271 patent request, and according to the $2^{nd}$ alteration, the present invention can work and produce energy with high and low waves, while PCT/IL01/00271 patent request can work only with low waves.

The present invention produces energy in the most efficient way, and the invention's technology is better than PCT/IL011/00271 patent request.

4. (i) Patent GB 384603A and Patent JP 57081168 have one crankshaft mechanism for the whole paddles.

The energy consideration is:

The power of each wave is known on the basis of the wave's height and width. The wave strikes the first paddle, the second paddle, the third paddle and so forth, until the wave completely flattens, and then the next wave comes along. Just like an accumulator that is depleted, so the system takes all the power minus losses.

In General:

$$\text{Power} = \frac{\text{Energy}}{\text{Time}} =$$

$$\text{The plant's power} = \frac{\text{The total energies of all paddles situated in series between two waves}}{\text{Time between two waves}}$$

The mathematical principle of calculating the wattage:

P—The power as calculated according to its height and breadth.

μ—Paddle efficiency.

| Number of Paddles - N | Wave power before the Nth Paddle | Paddle Power |
|---|---|---|
| 1 | P | $P * \mu$ |
| 2 | $P - P * \mu$ | $(P - P * \mu) * \mu$ |
| 3 | $(P - P * \mu) - (P - P * \mu) * \mu =$ $P(1 - \mu)^2$ | $P(1 - \mu)^2 * \mu$ |
| . | . | . |
| . | . | . |
| . | . | . |

P - The power as calculated according to its height and breadth.
$\mu$ - Paddle efficiency.

Thus, the series continues, so that the greater the number of paddles, the greater the system power, up to the maximum P.

The rod that links the last paddle to the crankshaft mechanism in Patent GB 384603A and Patent JP 57081168 is extremely big and long because of the long distance between two waves.

In order to obtain maximum power, it is necessary to provide at least 15 paddles. When the waves are 2 meters to 5 meters height, the distance between two waves is 50-100 meters, so that said rod must also be 50-100 meters!

Because such a great rod length is required, the profile of the rod proposed in GB 384603A or in Patent JP 57081168 is extremely thick and large, so that it should not bend under the force of the waves, and quite impractical.

Because of the weight of the rod proposed in GB 384603A or in Patent JP 57081168, and the slow wave speed prevailing under said conditions, it is not possible to attain the minimum speed of 500 rpm required to rotate the flywheel of the oil pump (linked to the accumulator that drives an oil engine, which in turn drives a generator and produces the electric energy).

Thus, it should be emphasized, that the arrangements proposed in GB 384603A or in Patent JP 57081168 are completely impractical where waves higher than 2 meters are concerned.

Thus, Patent GB 384603A and Patent JP 57081168 are only applicable when Waves are small and the distance between two waves is short. Where higher waves are concerned, the entire plant proposed by GB 384603 A or by Patent JP 57081168 become dysfunctional and cannot be used.

The present invention has a crankshaft mechanism for each paddle unit, without used a rod to link among the paddles. Each paddle unit is operated independently.

The present invention is equally practicable for both small and large waves and can be used to obtain high power capacities under both sea conditions, and this is the technological innovation of my patent application over the patents: GB 384603A and JP 57081168.

The present invention shows below in claim 1 (the main claim), that it incorporates the features referring to crankshaft mechanism and a piston and also to providing each of the paddle units with a dedicated crankshaft mechanism to show the difference in patents GB 384603A and JP 57081168 in which the whole plate has one crankshaft mechanism.

(ii) Patent GB 384603A and Patent JP 57081168 don't utilize the energy of backward paddle unit motion, after a wave leaves the paddle's plate and the paddle falls pivoting with its gravitation and the backward wave's power, this paddle energy is not utilized. The only energy that is utilized is the energy of a wave that hits the paddle's plates. The gravitation energy of each paddle and the backward wave's power, aren't utilized.

The present invention utilizes the whole paddle energy.

The invention has a Two-Direction piston for each paddle. When a paddle moves forward with the wave, the piston inside the hydraulic cylinder pushes oil to the first accumulator, after the wave leaves the paddle, it returns backward and the same piston pushes oil to the second accumulator. The two accumulators send the oil through pipes to an hydraulic engine that rotates a generator. The present invention receives energy from both motions: paddle pivotal forward motion and paddle pivotal backward motion.

The present invention shows in claim 1 that either, in forward paddle unit motion, the paddle's energy is accepted and consumed and, in backward paddle unit motion, the paddle's energy is accepted and consumed. This is the second technological innovation of my patent application over patents: GB 384603A and JP 57081168.

5. U.S. Pat. No. 5,244,359 describes a marine energy converter system based on utilization of differences in sea level which it converts into linear movement only of piston 21 which moves within its casing 17. The casing 17 is rigidly connected with pole 3 which is anchored at the bottom of the sea. The above converter can only exploit linear monement, and does not make it possible to exploit the dynamic energy of the sea waves. The above converter is equipped with a floating system piston. The piston is connected to a float 41 and this enables the linear movement of the piston within the piston casing. As a result the piston, within its casing, by virtue of the rising level of water, requires very little force to rise. However, since energy is always a product of force multiplied by distance, the resultant energy is very small as a consequence of the small amount of force exerted.

The present invention, however, is based on a different principle, i.e., the exploitation of the dynamic energy of sea waves, which give rise to pivotal movement of the paddles rather than their elevation. The pivotal movement is subsequently converted into linear movement of the piston by means of a crankshaft mechanism 32,40. The piston rises within the casing with relatively great force and the energy produced is thus greater.

Thanks to the structure of the system according to the present invention, it is possible to utilize waves regardless of the height of the wave itself.

Both from the point of view of the present invention's operating principle and from the point of view of its particular structure, the U.S. Pat. No. 5,244,359 energy converter is not similar to the present invention.

6. U.S. Pat. No. 4,843,249 describes a hydroelectric system, which utilizes the movement of the waves and converts them into circular movement. Said system includes a turbine 22 whose vanes are moved by the moving wave. The turbine wheel is connected to equipment for the generation of electrical energy.

The present invention, by comparison, does not convey circular energy, but rather utilizes the axial movement of the paddles to move the piston in a linear motion.

As in the previous case, the above U.S. patent does not void the innovation or the innovation of the present invention, neither in principle nor from the point of view of the structure of the above-described patent.

It may also be noted, that the utilization of wave energy in order to create circular energy along, is inferior to the creation of linear motion, on the following counts:

In order to achieve better that 90% utilization, for example, a pump activated through circular energy must rotate as speeds of 500-5000 rpm. Below 500 rpm, the efficiency rate is abruptly reduced to about 40%. In order to attain such high speeds, when the wave movement is relatively low, it is necessary to provide additional transmission by means of a few pairs of cog-wheels, thus creating losses in the system. Moreover, if we introduce a number of pairs of cog-wheels, then the total efficiency of the system is reduced, and the energy produced is thus far lower. The cost of the system too, is increased through the provision of may pairs of additional cogwheels.

However, when the piston moves in a linear motion, the immediate efficiency of the system is at least 90% and a linear pump is not limited by any constraints.

7. U.S. Pat. No. 53,311,064 describes a system for generating energy from the movement of sea waves, based on a similar principle to that of the above described hydro-electric system, i.e., the use of a turbine which is rotated by the flow of water. The circular movement is conveyed to the energy generating mechanism by means of a transmission mechanism.

All the above given explanations regarding the hydro-electric system according to U.S. Pat. No. 4,843,249, are also valid in this case, both as regards circular motion versus linear motion and the differing structure.

8. Fr Patent 501795 described a system for generating energy from the movement of sea waves.

(i) The system has one paddle. The low extremity of the paddle's plate is a buoy that moves vertically up and down when the wave reaches the plate. The paddle receives only the height energy from the wave.

When a wave hits a paddle, the paddle goes up in pivotal movement. In this way, each paddle receives energies from: a. the wave height energy which is, potential energy plus b. the wave movement energy, which is kinetic energy. The present invention receives from each paddle much more energy in comparison to the above Fr Patent 501795.

(ii) The present invention has at least two paddles. The Fr Patent 501795 has one paddle. The advantage of the present invention from this reason is the same as explained in 2(i) above as regards towards U.S. Pat. No. 5,084,630.

9. JP patent 006750 converters can only exploit linear movement, and does not make it possible to exploit the dynamic energy of the sea waves. The hydraulic cylinders 2 and 2a, are pistons connected to a float 1 and this enables the linear movement of the pistons within the piston casing. As a result the pistons within the casing, by virtue of the rising level of water, require very little force to rice. However, since energy is always a product of force multiplied by distance, the resultant energy is very small as a consequence of the small amount of force exerted.

The present invention, however, is based on a different principle, i.e., the exploitation of the dynamic energy of sea waves, which give rise to pivotal movement of the paddles rather than their elevation. The pivotal movement is subsequently converted into linear movement of the bi-directional piston by means of a crankshaft mechanism 32, 40. The piston rises within the casing with relatively great force and while the energy produced is a product of force multiplied by distance, the resultant energy is higher as a consequence of the high amount of force exerted. Thus the energy produced according to this system is greater then JP patent 006750.

10. U.S. Pat. No. 4,490,621 described a system for generating energy with two hydraulic motors, one hydraulic motor 121a, for low waves and one hydraulic motor 121b for high waves with very complicated system. When the oil pressure PLa>PLb then first hydraulic motor 121a works and when the oil pressure PLa<PLb, the second hydraulic motor works. The present invention works with all kinds of oil pressure with the same hydraulic motor. If for example, the present invention works with a system of three hydraulic motors, the U.S. Pat. No. 4,490,621 requires 6 hydraulic motors: three for law waves plus three for high waves, which is very expensive and with very complicated system. The present invention is more economical and much simpler than U.S. Pat. No. 4,490,621.

11. U.S. Pat. No. 1,960,622 generate energy does not establish optimum distance of the paddle heights, to make plan maximum energy production, since the rod 20 and the plate 25 move upwards or downwards synchronously, automatically, but not supervised as described in the present invention, with the movement of the sea level at tide time.

The paddles' system according to the present invention stays in the optimum fixed position even when the sea water continues to move upwards and downwards with the tide to create the plant maximum energy production, while in the U.S. Pat. No. 1,960,622, the rod 20 and the plate 25, move upwards or downwards all the time with the sea water at the tide time.

DETAILED DESCRIPTION OF THE PREFERRED EMBODIMENT

Figure 1:
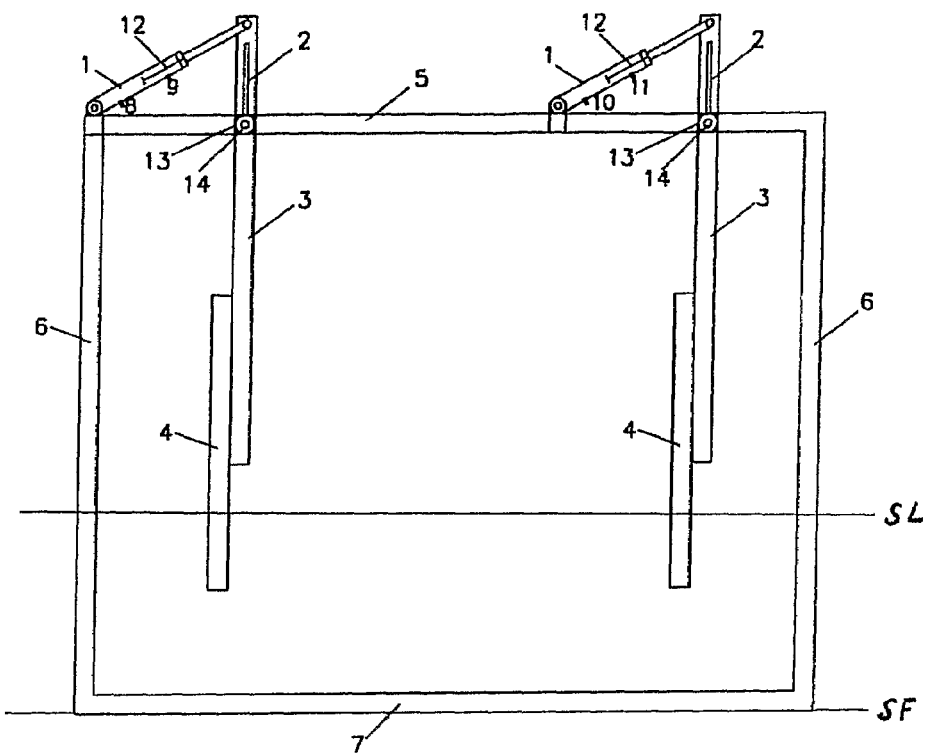
FIG. 1. A view of the system according to the invention, showing the positions of two paddles and their pistons before a wave hits.

With reference to FIG. 1, the system in accordance with the present invention comprises a support structure 7 consisting of legs 6 carrying an upper frame 5. The legs are anchored in the sea floor SF. SL is the sea level.

On the upper frame there are mounted at least two paddle units, which will be described in more detail below, Each paddle unit comprises a paddle rod 3 connected to a housing 13. Within the housing there is mounted an axle 14, which is rigidly secured to the upper frame.

Each paddle unit comprises a paddle rod 3 rigidly connected to the housing 13. The housing is mounted around an axle 14, secured to the upper frame 14. A rotational movement of the housing with respect to the axle is accomplished by virtue of a pivotal movement of the paddle rod 3 with the plate 4, driven by a wave.

Figure 3:
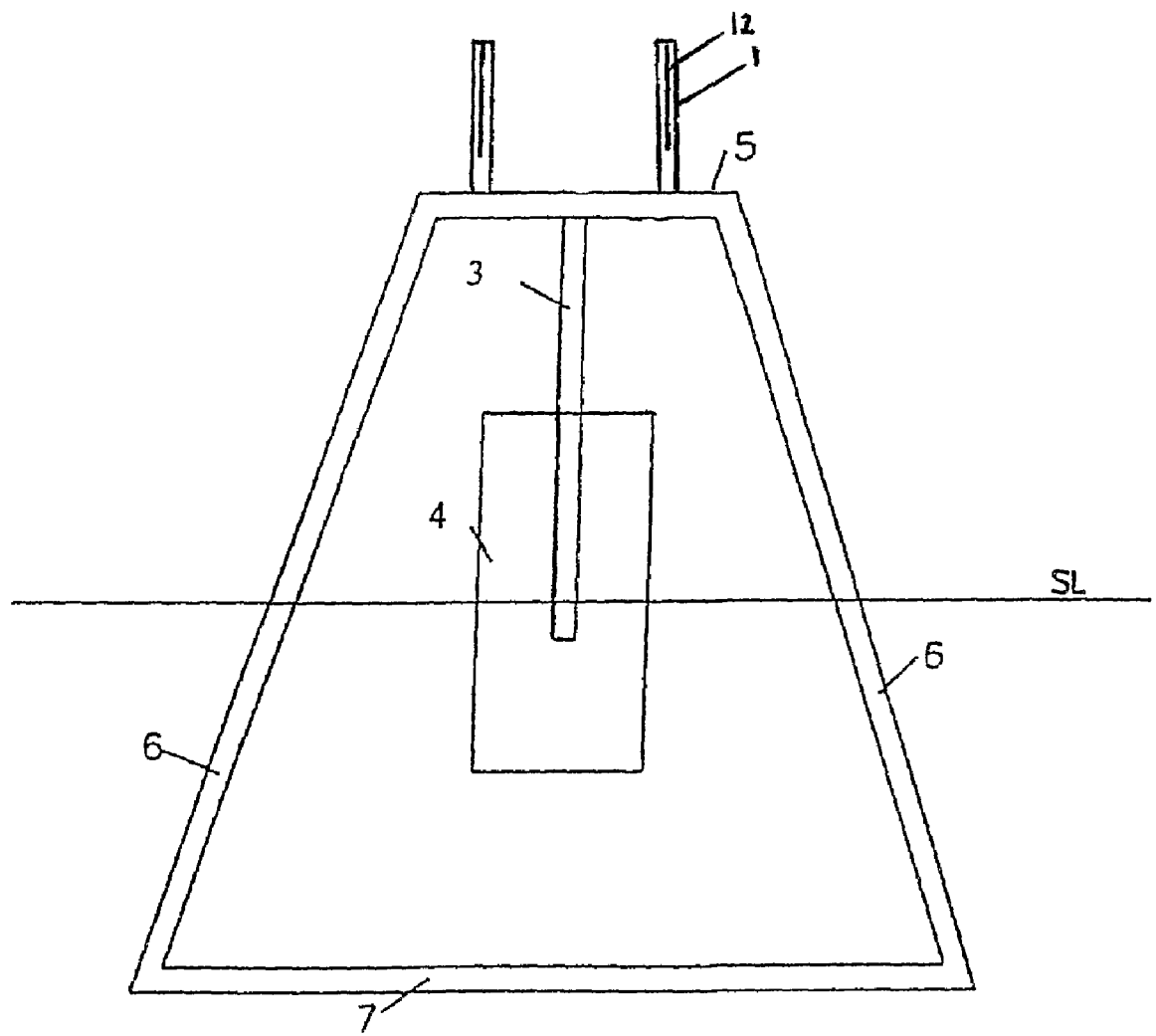
FIG. 3. Shows a side view of the system in accordance with the present invention.

The lower extremity of the paddle rod 3 is terminated by a paddle plate 4, which encounters the wave and is driven thereby. The height of the legs 6 and also the distance between the upper frame 5 and the sea level SL is chosen in such a manner that the main portion of the paddle plate 4 is submerged under sea level, while the 4 upper part of the paddled plate 4 thereof is situated above sea level SL as can be seen in FIG. 3. By virtue of this disposition it is possible to utilize the energy of the wave approaching the paddle plate not only above sea level but also below.

In contrast to the known system described in U.S. Pat. No. 5,084,630, where the energy of a wave broken by the paddle is not consumed fully, as the wave continues to move freely, in the present invention all paddle units are arranged in series. By virtue of this arrangement, the energy of a wave, after it has been broken by a leading paddle unit, will be consumed by a successive paddle unit.

Due to this arrangement the energy of approaching waves is consumed the in most efficient way.

Figure 2:
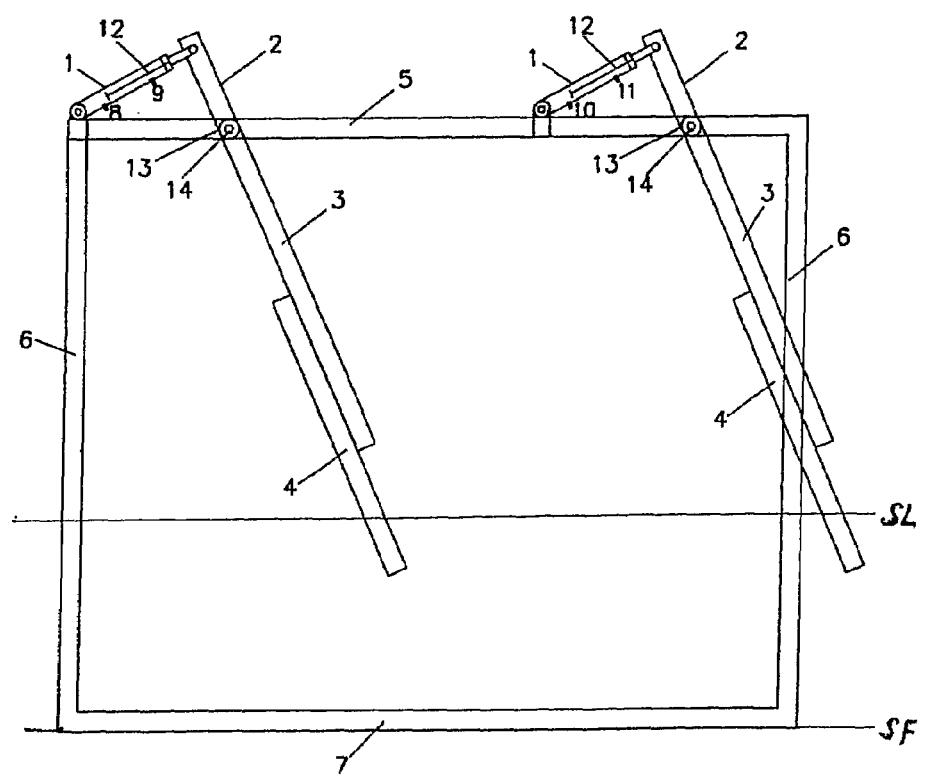
FIG. 2. A view of the system according to the invention, showing the positions of two paddles and their pistons driven by a wave.

With reference to FIG. 1 and FIG. 2 one can see different stages of a pivotal moving paddle driven by a wave entering the system. The piston rods 12 move inside hydraulic cylinders 1, with the paddles motion. In the forward paddle motions the bi-directional piston rods press oil into the first accumulator via pipes 8 and 10 and in the backward paddles motion the bi-directional piston rods press oil via pipes 9 and 11 to the second accumulator. SF is the sea floor and SL is the sea level.

In practice for a sea floor depth of 3 m and a wave height of 1 m (defined as: 0.5 m above sea level and 0.5 m below sea level) the following paddle dimensions may be recommended: the length of the paddle rod can be 5.5 m, the height of the paddle plate can be 0.5 m-3 m, the width of the paddle plate can be 2 m, and the distance D can be 1 m. If the dimensions are given as above, the distance between two paddle units belonging to the same system should be 1 m-1.5 m.

With reference to FIG. 3, the system in accordance with the present invention comprises a support structure 7 consisting of legs 6 carrying an upper frame 5. The legs are anchored in the sea floor. The paddle rod 3 hangs on the upper frame. The FIG. 3 shows that part of the paddle plate is located above the sea level SL and part below.

Now with reference to FIGS. 1,2,4 it will be explained how the pivotal movement of the paddle rods, driven by sea waves is transformed into energy:

As shown, the housing 13 is rigidly connected with an intermediate rod 14, which terminates with part 2.

It can be readily understood that the combination of part 2 and, 12 constitutes a common crankshaft mechanism, which the pivotal movement paddle rod 3 transforms into a linear reciprocating motion of the piston rod 12.

It is not shown specifically, but should be understood that the hydraulic cylinder is connected with appropriate means for utilizing the flow of hydraulic fluid in both directions via the fluid ports.

In operation, the sea waves successively approach the first paddle unit and then the second paddle unit and thus cause pivotal movement of each paddle rod. Each paddle unit is provided with a dedicated crank shaft mechanism transforming this movement into a linear motion of the corresponding piston supplying hydraulic fluid from the corresponding cylinders 1 to two accumulators AC1 and AC2. Hydraulic fluid exits the accumulators and actuates an hydraulic engine, which drives a generator.

Figure 4:
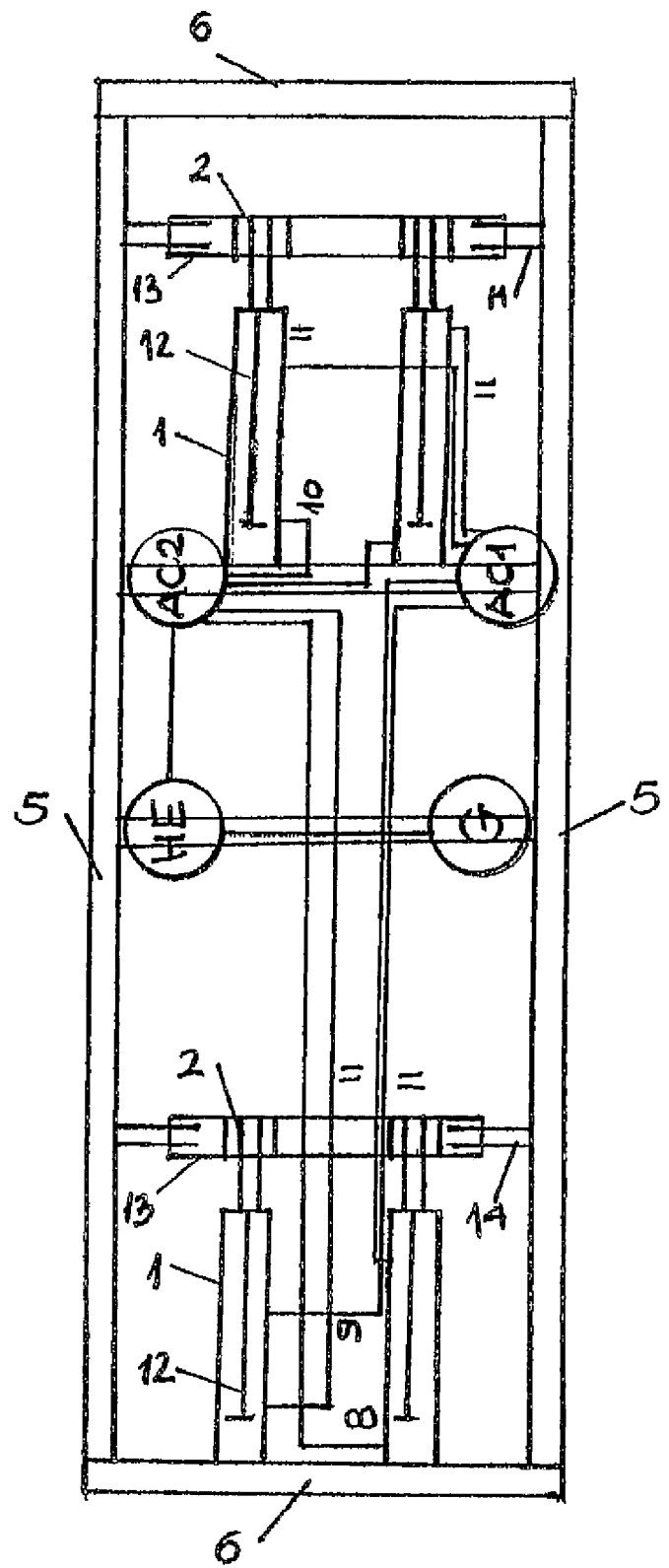
FIG. 4. Shows a top view of the system in accordance with the present invention.

With reference to FIG. 4, it explains how the pistons push oil to two accumulators:

While the piston rods 12 move forward inside bi-directional piston 1, the oil is transferred, through pipes 8 and 10, to the first accumulator AC2, and while the piston rods 12 move backward inside bi-directional piston 1, the oil is transferred through pipes 9 and 11 to the second accumulator AC1. The accumulators AC1 and AC2 transfer the oil to hydraulic engine HE, and the hydraulic engine rotates the generator G, which produces electric energy.

Both extremities of the piston rod 12 are connected to the hydraulic cylinder 1. By virtue of this arrangement it is possible to increase the amount of power produced by the same paddle unit.

The other important feature of the system in accordance with the present invention is the position of paddle plate 4 with respect to the sea floor that can be changed according to a time scale or at the time we want.

Figure 5:
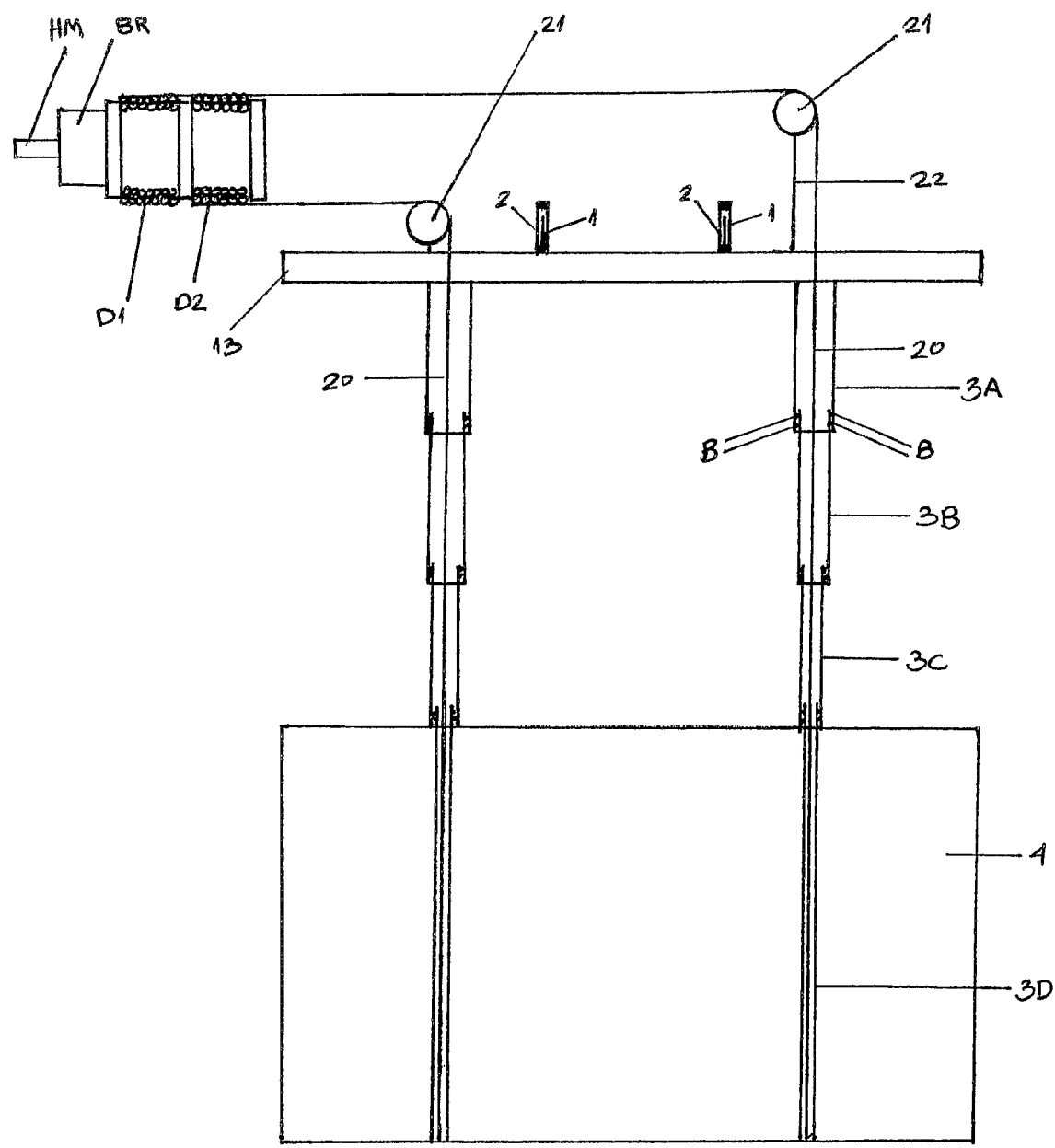
FIG. 5. Shows how the plate moves up and down by the operation of the, hydraulic motor, cables and a brake.

With reference to FIG. 5, the cables 20 is moved up and down by the hydraulic motor—HM. While the hydraulic motor pulls and pushes the cables 20 through the pulley 21, the cables 20 that is located inside the paddles' rod, which are the parts 3A, 3B, 3C and 3D, pulls and pushes the paddles' rod, 3A+3B+3C+3D, and the paddles' rod, 3A+3B+3C+3D, is operated like a "Telescope" and moves up and down in vertical motion with the plate 4. When the cable 20 moves up and down by the hydraulic motor HM, 3B moves inside 3A with the helps of the bearings-B and the same: with the helps of the bearings B, 3C move inside 3B and 3D move inside 3C, and the paddles' rod, 3A+3B+3C+3D, take the plate 4 up and down. The pulley 21 stands on the connection 21. The rods 2 are connected to the sleeve 13 and operate the pistons 1 as is shown in FIG. 1, FIG. 2, FIG. 3 and FIG. 4. The brake B that is connected to the hydraulic motor HM supervises the movements of the cables and the plant's paddles.

Figure 6:
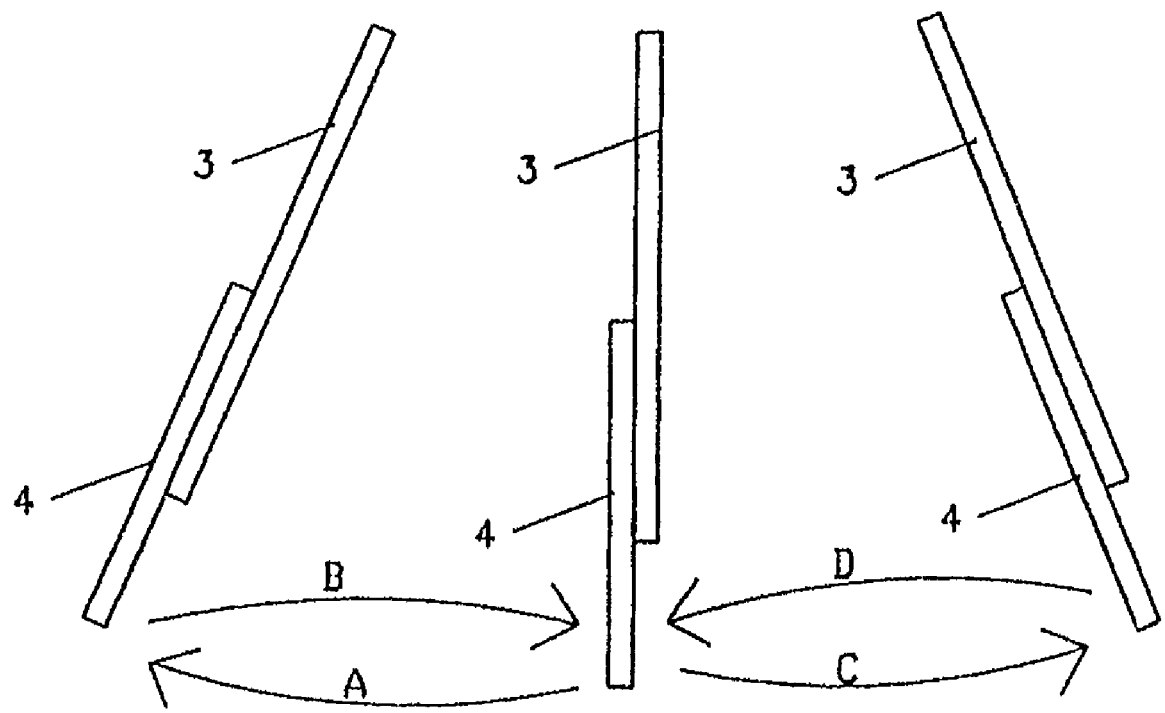
FIG. 6. Shows a paddle pivotal motion, forward and backward.

With reference to FIG. 6, a paddle moves forward and backward with a wave. The paddle,3 and 4, in the first position waits for the wave. The wave hits the plate 4, and the paddle moves forward in direction A. The wave leaves the plate, and the plate 4 receives the backward wave's power. The paddle returns to direction B and continues to direction C. Afterwards, the paddle falls, with gravity, to direction D, i.e. the first position.

Figure 7:
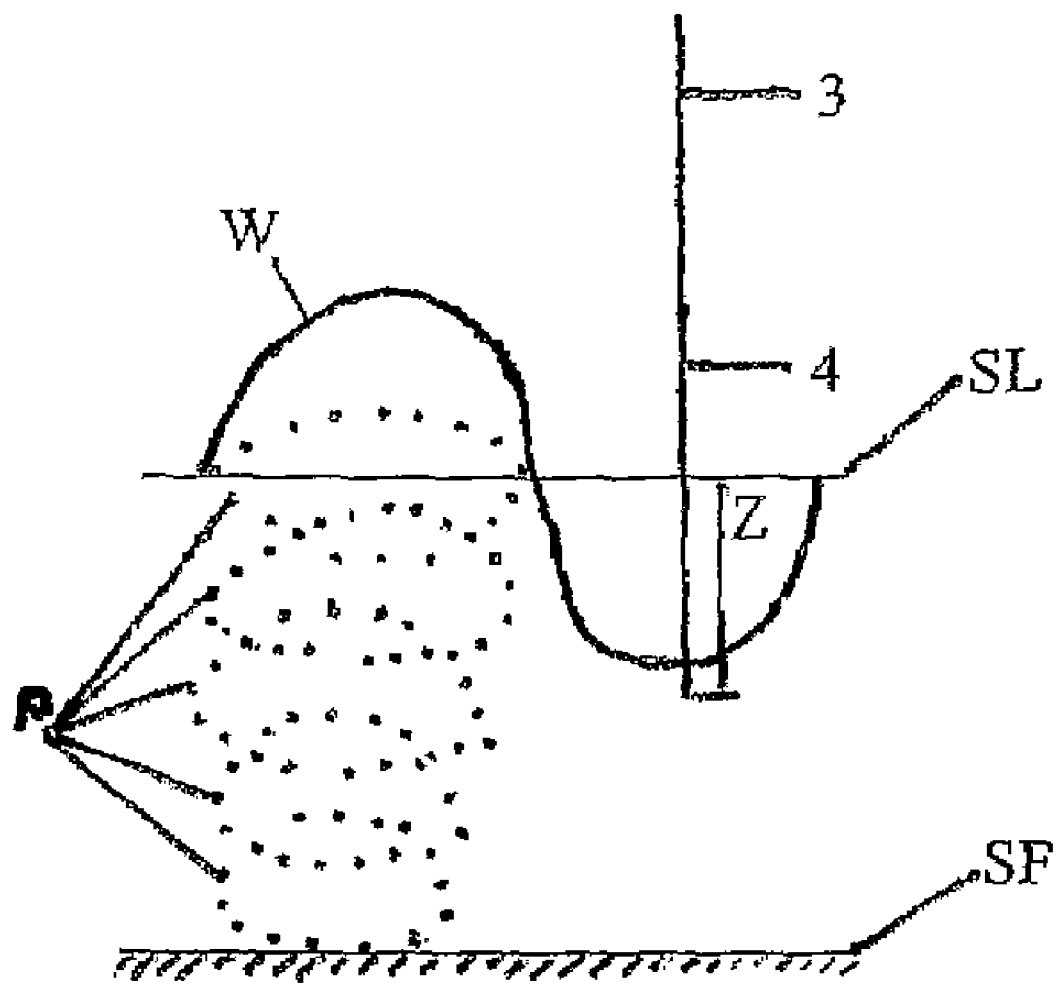
FIG. 7. Shows the location of a paddle's plate in the sea.

With reference to FIG. 7, Z determines the distance between the lower extremity of paddle plate 4 and the sea level. The wave's particles is P, move as it shown in this FIG. till the sea floor. As the plate is in a deeper position, Z is higher and the plate receives more energy from the wave's particles P.

With reference to FIG. 7 and FIG. 3, it has been found empirically that changing the distance between the lower extremity of paddle plate 4 and the sea floor SF, helps utilize the energy of a wave W approaching the paddle plate, in the most efficient way on any time scale e.g. tide time. On any time scale, the paddle plate can be moved up and down, by the system describes in FIG. 5. At a tide time, the plate moves up and all the time, part the paddle plate 4 is located above sea level SL and part below sea SL level. A wave's height is described as a sinus wave, while half of the wave height is above sea level and half is below sea level, for example: 1 meter wave's height is 0.5 meter above sea level and 0.5 meter is below sea level, pic-to-pic is 1 meter. The paddle plate 4 receives energy from the entire wave height as the wave hits the plate.

By the hydraulic principle described in FIG. 5 and as it can be shown in FIG. 7 the paddles move, at a tide time, in vertical motion while being supervised with the help of the brake B, to find the optimum fix position of the paddle's heights that include in it, the plate heights below the sea level Z. At the plant's paddle height optimum fix position in the respect of Z, the plant will produce the maximum energy from the waves, said paddle's heights stay in this position even when the sea water continues to move up and down with the tide.

The optimum paddle fix position for receiving maximum energy from the wave, is while the plate is in a deepest position below the sea level SL, so the Z is highest with the possibility that the whole paddle will continue move in the best way, in pivotal movement. The system in FIG. 5 is supervises the paddles heights, to find the optimum paddle fix position with maximum Z, to use the energy of the wave's particles P, in the most and efficient way, for having the maximum plant energy production.

The invention claimed is:

1. A system for producing energy from sea waves, said system comprising a support assembly adapted for resting on a sea floor and having legs (6), anchorable to the sea floor, said legs supporting an upper frame (5), said system further comprising at least two paddle units, which are carried by the upper frame, each paddle unit comprising a paddle rod (3) and a paddle plate (4), said paddle plate being connectable to a lower extremity of the paddle rod, wherein each paddle rod is secured at the upper frame with possibility for pivoting with respect thereto and said at least two paddle units are deployed on the support assembly in such a manner that their respective paddle plates are arranged in series to be successively driven forward and backward by the sea waves, wherein said upper frame (5) is fitted with axles (14) and there are provided respective sleeve housings (13) mounted with possibility for pivoting about the axles (14) and wherein an upper extremity of each paddle rod (3) is rigidly secured at the respective sleeve housing (13) such that the sleeve housing can be pivotally driven by the paddle rod (3), said system further comprising a converting means operatively coupled to the sleeve housings (13) and said converting means is capable to convert pivotal motion of the sleeve housings (13) into an energy irrespective whether the paddle plates are driven by the sea waves backward or forward.

2. A system as defined in claim 1, in which said converting means comprises a crank mechanism, at least a first (AC1) and a second (AC2) accumulator, a hydraulic engine (HE) and a generator (G), wherein the crank mechanism is operatively coupled to the first and to the second accumulator to actuate either the first or the second accumulator depending whether the paddle plates are driven by the sea waves forward or backward.

3. A system as defined in claim 2, in which the crank mechanism comprises a piston rod (12), a hydraulic cylinder (1) and an extension rod (2), wherein one end of the extension rod is connected to the piston rod (12) and an opposite end of the extension rod (2) is connected to the sleeve housing (13), the arrangement being such that pivotal motion of the sleeve housing (13) is associated with a reciprocating linear motion of the extension rod (2) upon which a hydraulic fluid is supplied from the hydraulic cylinder (1) to either the first or the second accumulator.

4. A system as defined in claim 1, in which the paddle rod (3) has a variable length such that a distance from the paddle plate (4) to either the sea floor or to a sea level can be adjusted.

5. A system as defined in claim 1, in which the legs (6) have adjustable length such that a distance from the paddle plate (4) to either the sea floor or to a sea level can be adjusted.

6. A system as defined in claim 4, in which the paddle rod (3) is configured as a telescope and there is provided a mechanism for variation the length of the telescope.

7. A system as defined in claim 6, in which said telescope comprises telescope sections (3A, 3B, 3C, 3D) and said mechanism for variation the length comprises a motor (D1, D2) and at least one cable (20) connected to the paddle plate (4) wherein said telescope sections are displaceable upon pulling the cable by the motor.

8. A system as defined in claim 4, in which the distance from the paddle plate (4) to the sea floor or to the sea level is adjustable simultaneously for all paddle units.

* * * * *